March 31, 1970 J. J. MIYATA 3,504,134

MULTIPLE MAGNETIC HEAD WITH A STRIP CORE HAVING A COMMON BASE PORTION

Filed July 13, 1966 5 Sheets-Sheet 1

INVENTOR
JOHN J. MIYATA

BY Louis A Kline
John J. Matlago
Nathan Cass
HIS ATTORNEYS

March 31, 1970 J. J. MIYATA 3,504,134

MULTIPLE MAGNETIC HEAD WITH A STRIP CORE HAVING A COMMON BASE PORTION

Filed July 13, 1966 5 Sheets-Sheet 2

INVENTOR
JOHN J. MIYATA

BY Louis A Kline
John J. Maclaga
Nathan Cass
HIS ATTORNEYS

INVENTOR
JOHN J. MIYATA

Louis A. Kline
BY John J. Matlago
Nathan Cass
HIS ATTORNEYS

INVENTOR
JOHN J. MIYATA

BY Louis A. Kline
John J. Matlago
Nathan Cass
HIS ATTORNEYS

INVENTOR
JOHN J. MIYATA

BY Louis A. Kline
John J. Matlago
Nathan Cass
HIS ATTORNEYS 3,504,134

MULTIPLE MAGNETIC HEAD WITH A STRIP CORE HAVING A COMMON BASE PORTION

John J. Miyata, Monterey Park, Calif., assignor to The National Cash Register Company, Dayton, Ohio, a corporation of Maryland Filed July 13, 1966, Ser. No. 564,912
Int. Cl. G11b *5/16, 5/28, 5/42*
U.S. Cl. 179—100.2 3 Claims

ABSTRACT OF THE DISCLOSURE

A multiple magnetic head unit including a plurality of strips of a high permeability magnetic alloy material. Each strip is shaped in the general form of a hairpin having a pair of legs closely adjacent to their ends with one of the legs of each pair being sharply bent near its end so as to form an even gap interface. A very thin layer of non-magnetic material is disposed between the closely adjacent ends of each pair of legs and a winding is coupled to at least one of the legs.

This invention relates generally to magnetic transducer devices, and more particularly to novel magnetic transducer constructions and methods of making.

The magnetic transducer art has for many years been plagued by the extreme complexity and cost involved in making magnetic heads, and these difficulties continue to mount as the art progresses to higher and higher recording densities and smaller and smaller heads. It will be understood that the construction of such heads presents unusual problems because of the difficulties involved in making and assembling the small precisely dimensioned parts required, and particularly in providing the required windings therefor which are not only very small but use delicate conductors of very small diameter.

Accordingly, a broad object of the present invention is to provide improved magnetic head constructions and methods of making.

Another object of the invention is to provide improvements in the construction and method of making multiple head units containing individual read and write head portions.

A further object of this invention is to provide improvements in the construction and method of making miniature heads capable of high density recording and reproducing.

Still another object of the invention is to provide improved means and methods for providing the windings of a magnetic head.

Briefly, in accordance with a typical embodiment of the present invention, the basic magnetic core is formed from a very high permeability strip of magnetic alloy material which is bent into a shape generally resembling a "hairpin," and then annealed to optimize magetic properties. The windings for the head are wound apart from the "hairpin" on an appropriate coil winding machine so as to form a winding assembly containing all the required windings. This is a relatively simple matter, since there is no magnetic core present to hinder the winding operation. The legs of the "hairpin" are made sufficiently resilient to permit the winding assembly to be inserted on one leg thereof and the legs spot-welded together with a gap material therebetween without deleteriously affecting the magnetic properties of the resulting "hairpin" head. One or more of such hairpin heads are then suitably disposed in a housing for machining of the legs and the pole tips to the desired final dimensions.

Figure 4:
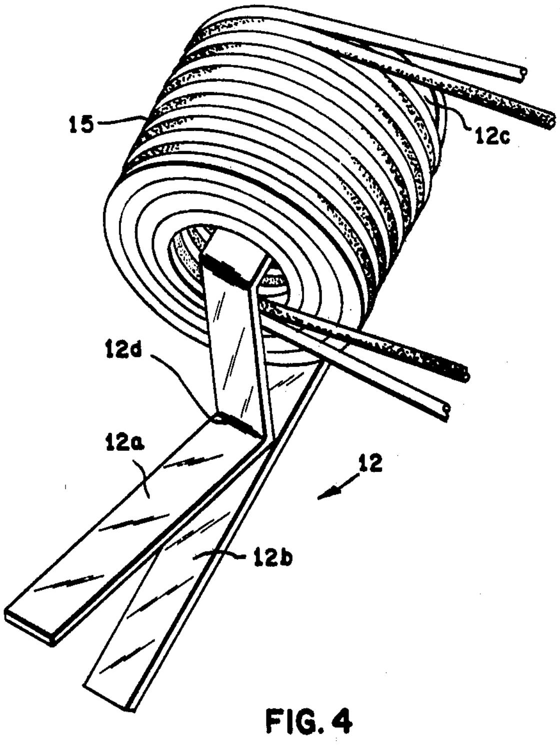
Figure 5:
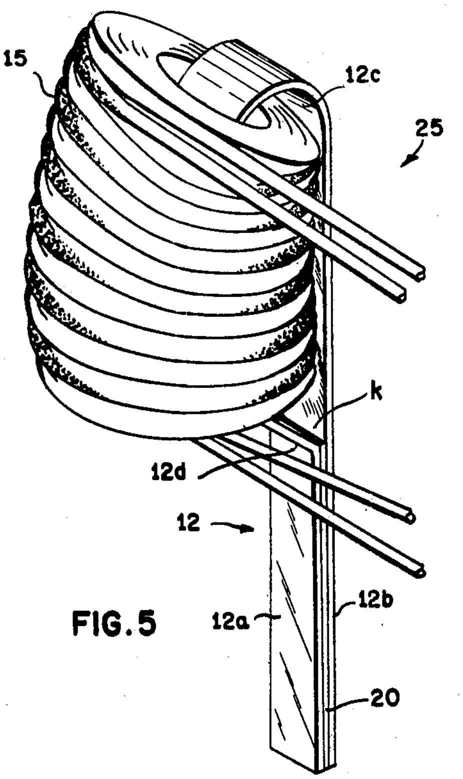
Figures 6, 7:
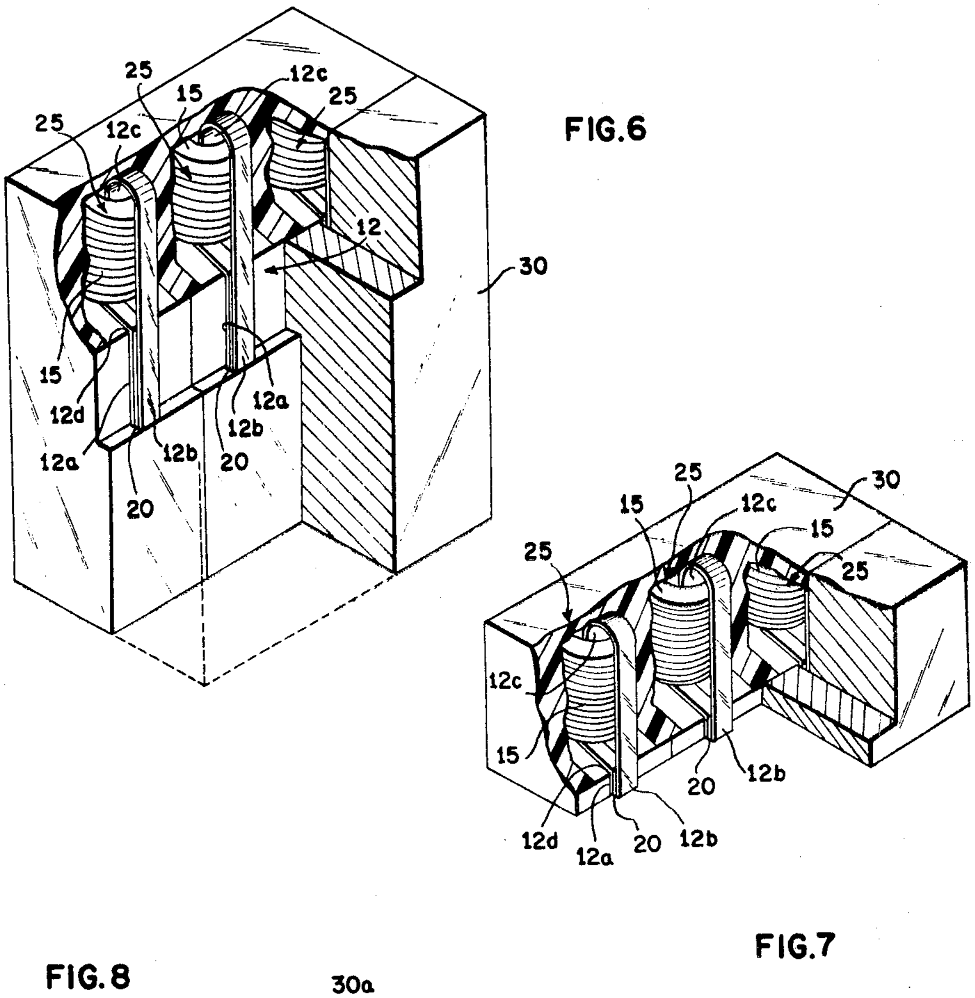
Figure 8:
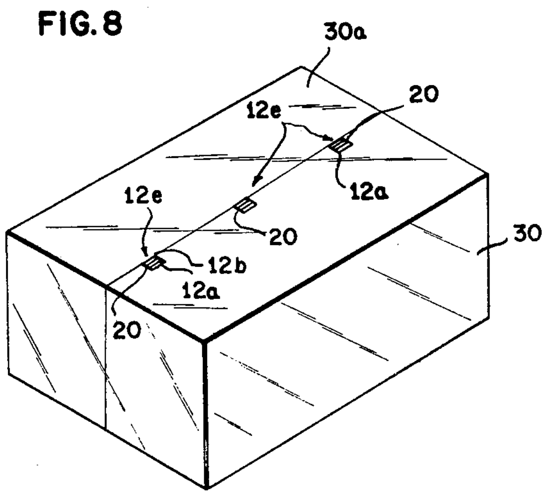
Figure 18:
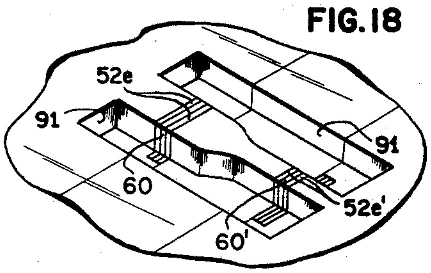
Figure 20:
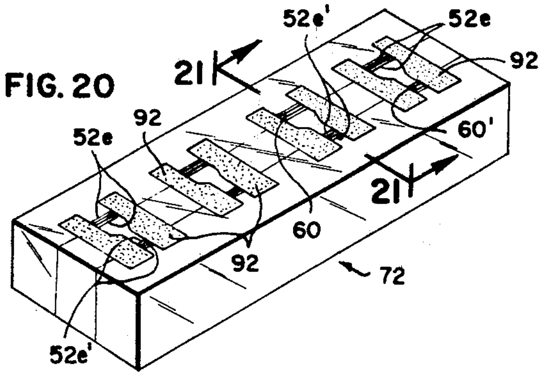
Figure 19:
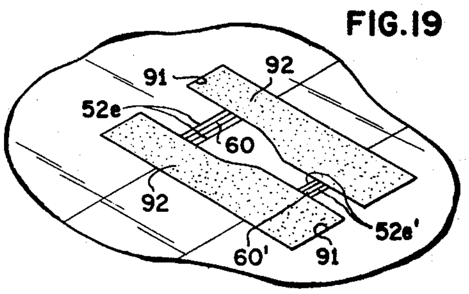
Figure 21:
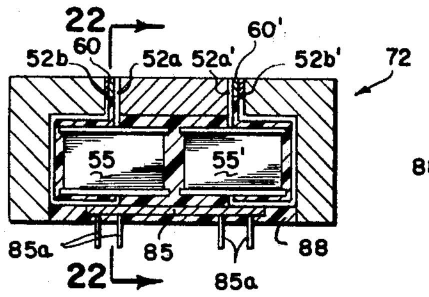

The specific nature of the invention as well as other advantages, objects and uses thereof will become evident from the following description and the accompanying drawings in which:

FIGS. 1–8 are views illustrating steps in the fabrication of a multiple hairpin magnetic head unit in accordance with the invention, the completed head being shown in FIGS. 7 and 8; and FIGS. 9–22 are views illustrating steps in the fabrication of a read-write multiple hairpin magnetic head unit in accordance with the invention, the completed head being shown in FIGS. 19–21.

Like numerals refer to like elements throughout the figures of the drawings.

Referring to FIGS. 1–8, illustrated therein are steps in the fabrication of a multiple magnetic head unit containing a plurality of aligned hairpin magnetic heads in accordance with the invention.

Figure 1:
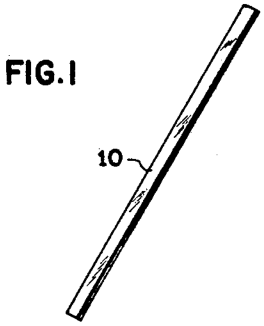
Figure 2:
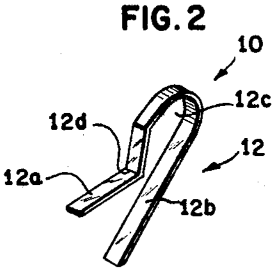

FIG. 1 shows the basic very high permeability strip 10 used in making a hairpin magnetic head. This strip 10 may typically be .0013 inch and preferably less than .002 inch thick, .020 inch wide and .80 inch long and made of a very high permeability alloy, such as high MU 80 obtainable from Carpenter Steel Company, Reading, Pa., or Molypermalloy obtainable from Allegheny Ludlum Steel Corporation, Pittsburgh, Pa., or Hipernom obtainable from Westinghouse Electric Corporation, Blairsville, Pa. Such material has a permeability of 30,000 and comprises approximately 78%–81% nickel, 14%–18% iron, 4%–5% molybdenum, and small quantities of such elements as carbon, silicon, and manganese. As shown in FIG. 2, this very high permeability strip 10 of FIG. 1 is bent into a hairpin-shaped core 12 having legs 12*a* and 12*b* and an upper opening 12*c* formed by providing a sharp bend 12*d* in leg 12*a*. The resulting hairpin core 12 of FIG. 2 is then annealed to optimize its magnetic properties.

Figure 3:
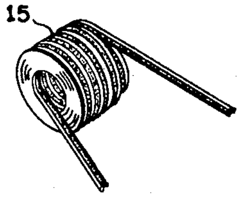

The head windings 15 for the hairpin core 12 of FIG. 2 are illustrated in FIG. 3. These windings 15 are wound on a suitable coil winding machine independently of the hairpin core 12 of FIG. 2, and are then inserted on leg 12*a* thereof, as shown in FIG. 4, the upper opening 12*c* of the hairpin core 12 being sufficiently large to accommodate the head windings 15. The head windings 15 may typically comprise 60 bifilar turns of 46 gauge wire. The next step is to spot weld a strip of gap material 20 between the legs 12*a* and 12*b* to form the resultant hairpin head 25 shown in FIG. 5, the gap strip being indicated by the numeral 20 in FIG. 5, and may typically be a .020 inch wide, .00025 inch thick and .25 inch long silver strip. The hairpin 12 is sufficiently resilient so that neither the insertion of the head windings 15 nor the spot welding to the final shape shown in FIG. 5 have a deleterious effect on the magnetic properties thereof.

One or more of the hairpin magnetic heads 25 shown in FIG. 5 are next encased in aligned fashion in a non-magnetic supporting structure 30, as typically illustrated in FIG. 6 for three hairpin heads. The supporting structure 30 with the hairpin heads 25 is then cut along the lower portion thereof, as illustrated in FIG. 7, so as to reduce legs 12*a* and 12*b* (FIG. 5) to the proper length desired for the gap interface, which should preferably be as small as possible for optimum efficiency, a length of .006 inch being typical, the length being preferably no greater than .01 inch nor less than .001 inch. The sharp bend 12*d* (FIG. 2) in leg 12*b* of the hairpin core 12 permits accurate control of the gap interface and the angle $k$ should preferably be greater than 60° and most preferably close to 90°.

As illustrated in FIG. 8, which is a view looking upward with respect to FIGS. 6 and 7, the pole tips 12*e* are finished in a common surface with respect to a face 30*a* of the supporting structure 30. Prior to such finishing an electrical spark discharge machine can be used to precisely shape the pole tips 12*e*. It will be understood that the face 30*a* of supporting structure 30 may be provided with any desired shape, as may be desirable, for example, where the head unit is to be used as a flying head with a disc where aerodynamic action is used to maintain the head at a precise distance from the disc surface.

Referring next to FIGS. 9–22, illustrated therein are steps in a modified method of fabrication of a multiple magnetic head unit in accordance with the invention having adjacent read and write sections, each section containing a plurality of aligned hairpin magnetic heads. Although the method of FIGS. 1–8 was described in connection with the fabrication of only one head section, it will be understood that it too can be provided with both read and write sections. As will become evident, an important difference between the fabrication methods of FIGS. 1–8 and FIGS. 9–22 is that the latter forms each plurality of aligned hairpin magnetic heads of a section out of a single integral piece of material, whereby the required precise alignment between each hairpin head of a section is automatically obtained, and the desired precise relationship between the two sections is readily achievable.

Figures 9, 10, 11, 12:
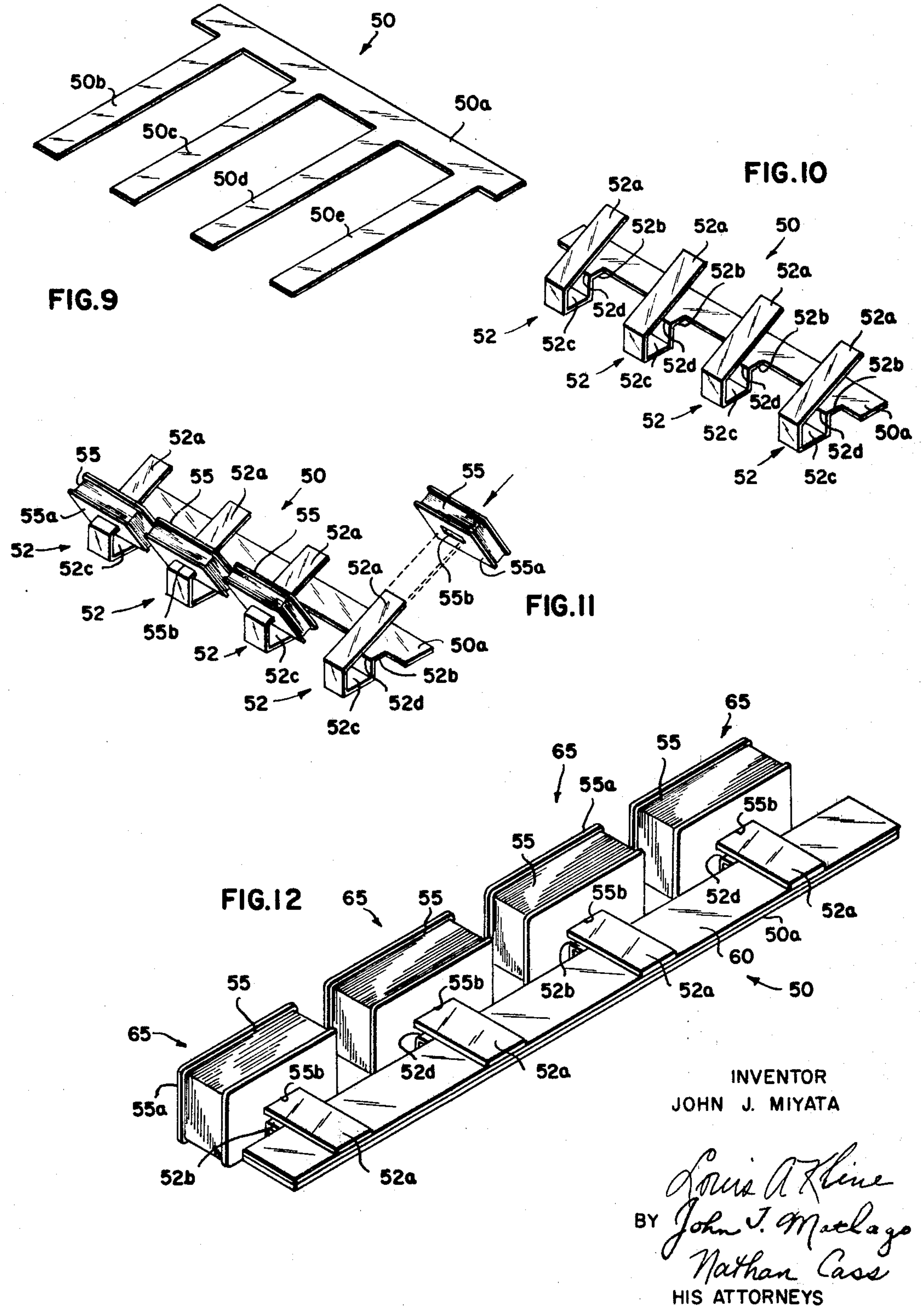

FIG. 9 shows the basic piece of very high permeability alloy material 50 used in making four aligned hairpin heads, there being one such piece of material for the read hairpin heads and another for the write hairpin heads. Since the initial steps in the fabrication of the read and write hairpin heads are the same, the fabrication of only one set of aligned heads will be considered at this point in the description. It will be understood that the same very high permeability alloy material may be employed as previously mentioned in connection with FIG. 1. As will be seen from FIG. 9, the basic piece of material 50 comprises a base 50*a* having four legs 50*b*, 50*c*, 50*d* and 50*e* extending therefrom, one for each hairpin magnetic head to be formed. Typically, the material 50 may be .0013 inch thick with each leg and the base being .04 inch wide, and the legs being .80 inch long and .20 inch apart measured from their centers.

Using a suitable forming fixture (not shown), the basic piece of high permeability alloy material 50 illustrated in FIG. 9 is shaped to form four hairpin cores 52 extending from base 50*a*, as illustrated in FIG. 10, each hairpin core 52 having legs 52*a* and 52B and an opening 52*c* formed by providing a sharp bend 52*d* in leg 52*b*. It will be understood from a comparison of FIGS. 2 and 10 that elements 52, 52*a*, 52*b*, 52*c* and 52*d* generally correspond to elements 12, 12*a*, 12*b*, 12*c* and 12*d* in FIG. 2 and are provided for like purposes. One difference, however, is that, as illustrated in FIG. 11, the head windings 55 for each hairpin core 5 are slipped on the unbent leg 52*a* thereof, which is advantageous in that the bend 52*d* in the other leg 52*b* of each hairpin core 52 can be made sharper to provide greater control of the gap interface and less strain on the core 52 and windings 55 when the gap strip 60 is spot welded between legs 52*a* and 52*b* of the hairpin heads 52, as shown in FIG. 12. Each of the head windings 55 is wound separately and apart from the hairpin cores 52, and may have the same number of bifilar turns and wire gauge as the head windings 15 of FIG. 3. However, for the embodiment of FIGS. 9–20, each of the head windings 55 is preferably wound on a suitable form 55*a* having an aperture 55*b* chosen to provide a snug accurate fit when inserted on its respective leg 52*a*, and having a size which will appropriately fit within its respective opening 52*c* after spot welding, as shown in FIG. 12. The gap strip 60 may be of the same material as in the embodiment of FIGS. 1–8.

Figures 13, 14:
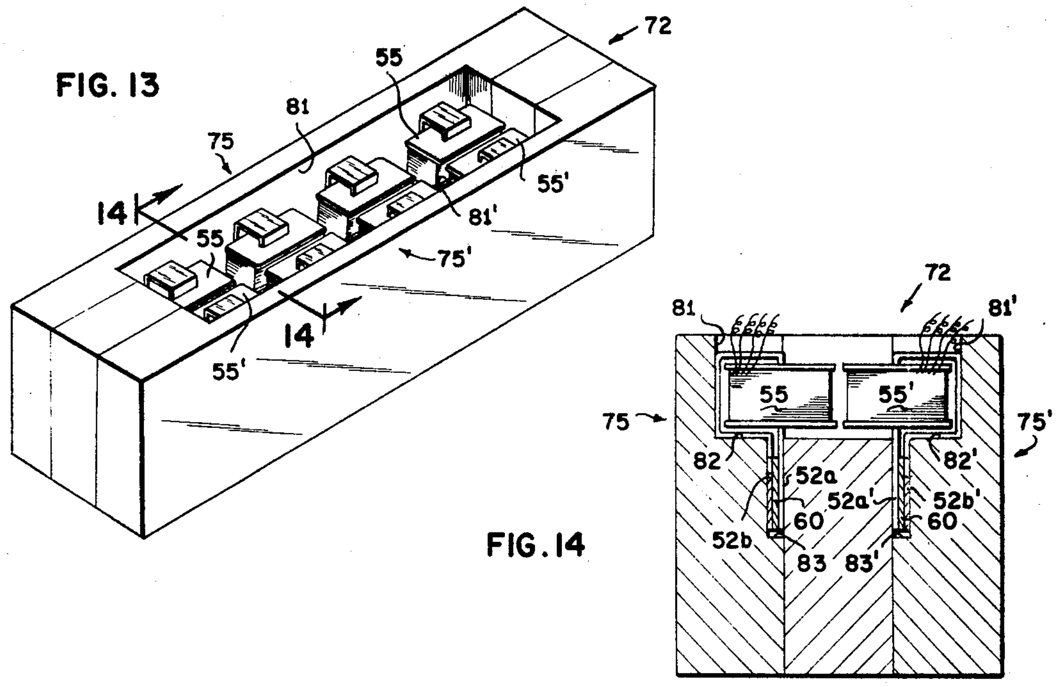

The resulting structure illustrated in FIG. 12 thus contains four integrally connected hairpin magnetic heads 65. The next step in the fabrication is to take two of these structures of FIG. 12, one for reading and one for writing, and to insert them into respective read and write sections 75 and 75′ of a non-magnetic metal supporting housing 72, as illustrated in FIGS. 13 and 14, FIG. 14 being a cross-sectional view taken along the line 14—14 in FIG. 13. Unprimed numerals will hereinafter refer to elements in the read section, while primed numerals will refer to elements in the write section.

Figure 15:
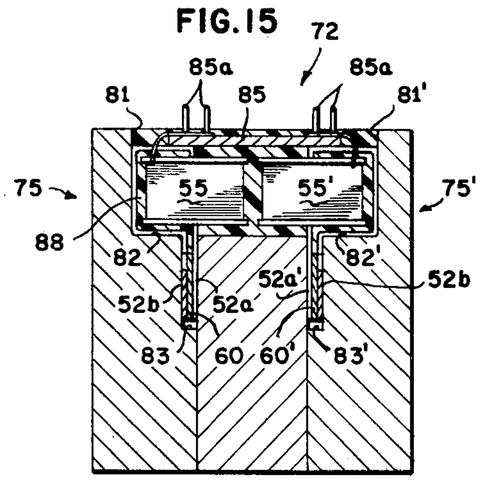

As will be seen from FIGS. 13 and 14, housing 72 is provided with a cavity 81 having a base 82 and slots 83 and 83′ (FIG. 14) accurately machined to receive the read and write hairpin head structures (each as illustrated in FIG. 12) with the spot welded legs 52*a*, 52*b* and 52*a′*, 52*b′* thereof fitting into respective slots 83 and 83′. A terminal board 85 having terminals 85*a* is next disposed over the hairpin heads, as illustrated in FIG. 15, and the ends of the head windings 55 and 55′ are soldered to respective ones thereof, after which the entire inner cavity 81 of the housing 72 is filled with potting compound 88 and suitably cured, whereby the read and write hairpin heads and terminal board 85 are secured in proper aligned position within cavity 81.

Figure 16:
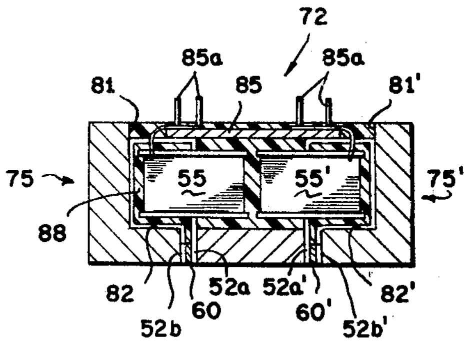
Figure 17:
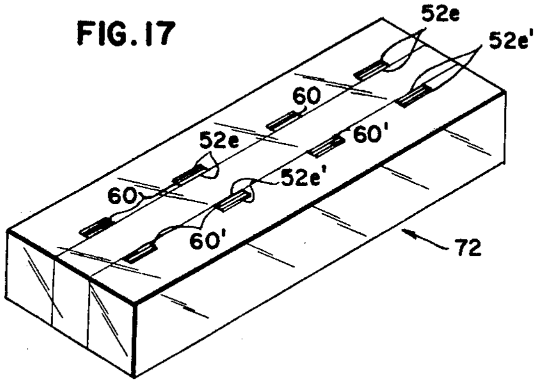

The next step, as illustrated in FIG. 16, is to cut the housing 72 along the lower portion thereof (as viewed in FIG. 14) so as to reduce the read hairpin legs 52*a* and 52*b* and the write hairpin legs 52*a′* and 52*b′* to the proper length desired for the gap interface, which may be the same as for the embodiment of FIGS. 1–8. The resulting multiple hairpin head unit containing both read and write sections 75 and 75′ is illustrated in FIG. 17, which is a view looking up at the pole tips 52*e* and 52*e′*.

Figure 22:
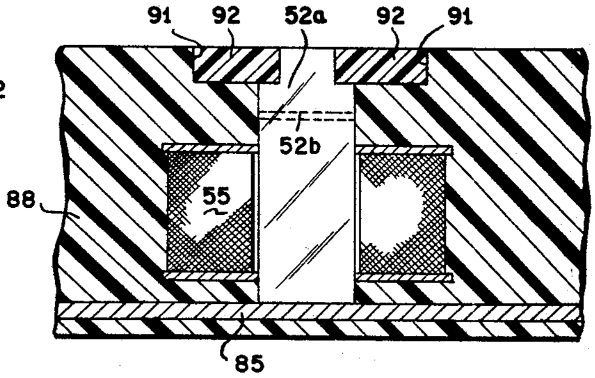

The final steps in the method are to properly shape the read and write pole tips 52*e* and 52*e′*, and to machine the pole tips and the adjacent surfaces of the housing 72 to final dimensions. The pole tips 52*e* and 52*e′* may advantageously be shaped using an electrical spark discharge machine which acts to remove conductive portions from a selected area. FIG. 18 is a fragmentary view illustrating the cut out portions 91 produced for a typical pair of aligned read and write hairpin heads using the electrical spark discharge machine. A read head width of .005 inch and a write head width of .0113 inch are typical, the write head width being made larger than the read head width to obtain wide-write, narrow-read recording and reproducing. As shown in the fragmentary view of FIG. 19, the cut out portions 91 produced by the electrical spark discharge machine are next filled with potting compound 92. The pole tips and adjacent surfaces of the housing are then machined to a common surface having the desired final dimensions, the resulting head being illustrated in FIGS. 20, 21 and 22. FIG. 21 is a cross-sectional view taken along the line 21—21 in FIG. 20, and FIG. 22 is a cross-sectional view taken along the line 22—22 in FIG. 21.

It is understood that the embodiments of the invention disclosed herein are only exemplary, and that many modifications and variations may be made therein without departing from the present invention. Accordingly, the present invention is to be considered as including all possible embodiments coming within the scope of the invention as defined in the appended claims.

What is claimed is:

1. In a multiple magnetic head unit, a single piece of a very high permeability magnetic alloy having a common base portion with a plurality of single strips each shaped in the general form of a hairpin having a pair of legs closely adjacent at their ends with one of the legs of each pair being straight and the other being sharply bent near its end so as to form an even gap interface, a very thin layer of non-magnetic material disposed between the closely adjacent ends of each pair of legs, and a winding encircling the straight leg of each pair.

2. In a multiple magnetic head unit, a non-magnetic housing containing a plurality of magnetic heads formed of a single piece of very high permeability magnetic alloy, said piece having a common base portion with a plurality of strips each shaped in the general form of a hairpin having a pair of legs closely adjacent at their ends with one of the legs of each pair being straight and the other being sharply bent near its end so that closely adjacent portions thereof form an even gap interface and the remaining portions thereof provide a winding receiving opening, a very thin layer of non-magnetic material disposed between the closely adjacent ends of each pair of legs, and a winding coupled to a leg of each pair said strips being precisely disposed in said housing substantially parallel to one another and precisely located with respect to at least one side of said housing such that the ends of said legs can be finished in a common surface with said housing so as to provide pole tips for said heads.

3. In a multiple magnetic head unit containing read and write sections, said head unit comprising: a non-magnetic housing containing a plurality of aligned magnetic read heads and a plurality of aligned magnetic write heads, said read heads being formed of a first integral piece of a very high permeability magnetic alloy and said write heads being formed of a second integral piece of a very high permeability magnetic alloy, each of said first and second integral pieces having a common base portion with a plurality of strips each shaped in the general form of a hairpin having a pair of legs closely adjacent at their ends with one of the legs of each pair being straight and the other being sharply bent near its end so that the closely adjacent portions thereof form an even gap interface and the remaining portions thereof provide a winding receiving opening, a very thin layer of non-magnetic material disposed between the closely adjacent ends of each pair of legs, and a winding encircling the straight leg of each pair, said first and second integral pieces being precisely disposed in said housing substantially parallel to one another and precisely located with respect to at least one side of said housing and the ends of said legs being finished in a common surface with said housing so as to provide pole tips for said heads.

References Cited

UNITED STATES PATENTS

| | | | |
|---|---|---|---|
| 2,668,878 | 2/1954 | Munroe | 179—100.2 |
| 2,868,889 | 1/1959 | Patterson | 179—100.2 |
| 2,785,038 | 3/1957 | Ferber | 346—74 |
| 2,946,859 | 7/1960 | Loewe et al. | 179—100.2 |
| 3,060,279 | 10/1962 | Harrison | 179—100.2 |
| 3,185,971 | 5/1965 | Brette et al. | 340—174.1 |
| 3,327,313 | 6/1967 | Oliver | 346—74 |

FOREIGN PATENTS

| | | |
|---|---|---|
| 1,120,728 | 12/1961 | Germany. |
| 794,318 | 4/1958 | Great Britain. |

BERNARD KONICK, Primary Examiner

R. S. TUPPER, Assistant Examiner

U.S. Cl. X.R.

29—603